United States Patent [19]
Spas

[11] Patent Number: 5,331,106
[45] Date of Patent: Jul. 19, 1994

[54] RESOURCE RECOVERY SYSTEM
[75] Inventor: Stanley E. Spas, El Dorado Hills, Calif.
[73] Assignee: Aerojet General Corporation, Rancho Cordova, Calif.
[21] Appl. No.: 831,120
[22] Filed: Feb. 4, 1992
[51] Int. Cl.[5] .............................................. C06B 21/00
[52] U.S. Cl. .................................. 588/202; 149/124; 423/130
[58] Field of Search ................ 588/202, 203; 149/124; 423/130

[56] References Cited
U.S. PATENT DOCUMENTS

| | | | |
|---|---|---|---|
| 3,451,789 | 6/1969 | McIntosh | 149/109.6 |
| 3,848,548 | 11/1974 | Bolejack et al. | 110/7 R |
| 4,057,442 | 11/1977 | Shaw et al. | 149/109.4 |
| 4,163,682 | 8/1979 | Montgomery | 149/109.6 |
| 4,198,209 | 4/1980 | Frosch | 149/124 |
| 4,229,182 | 10/1980 | Frosch | 149/124 |
| 4,376,666 | 3/1983 | Williams | 149/124 |
| 4,718,955 | 1/1988 | Raisor | 149/124 |
| 4,854,982 | 8/1989 | Melvin et al. | 149/124 |

Primary Examiner—Edward A. Miller
Attorney, Agent, or Firm—Townsend and Townsend Khourie and Crew

[57] ABSTRACT

Waste energetic compositions such as solid rocket propellant are treated to reclaim valuable aluminum particles and oxidizer in a form in which they can be reused, and to incinerate the remaining solids in a totally environmentally sound manner. An initial percentage (40–50% by weight) of the oxidizer is extracted during hydromining when the propellant is removed from the casing of a rocket motor. Additional oxidizer (35–45% by weight) is extracted from the propellant during subsequent underwater high speed maceration operations. The residual material containing mostly aluminum and binder matrix is thermally destroyed in a closed incinerator and the aluminum recovered as very high purity aluminum oxide.

21 Claims, 10 Drawing Sheets

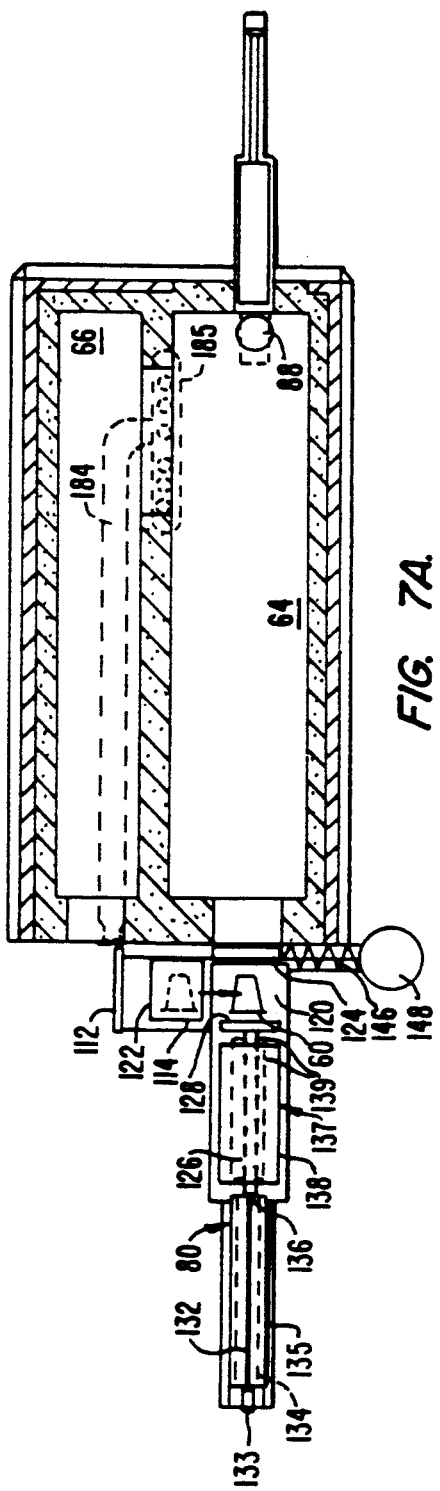
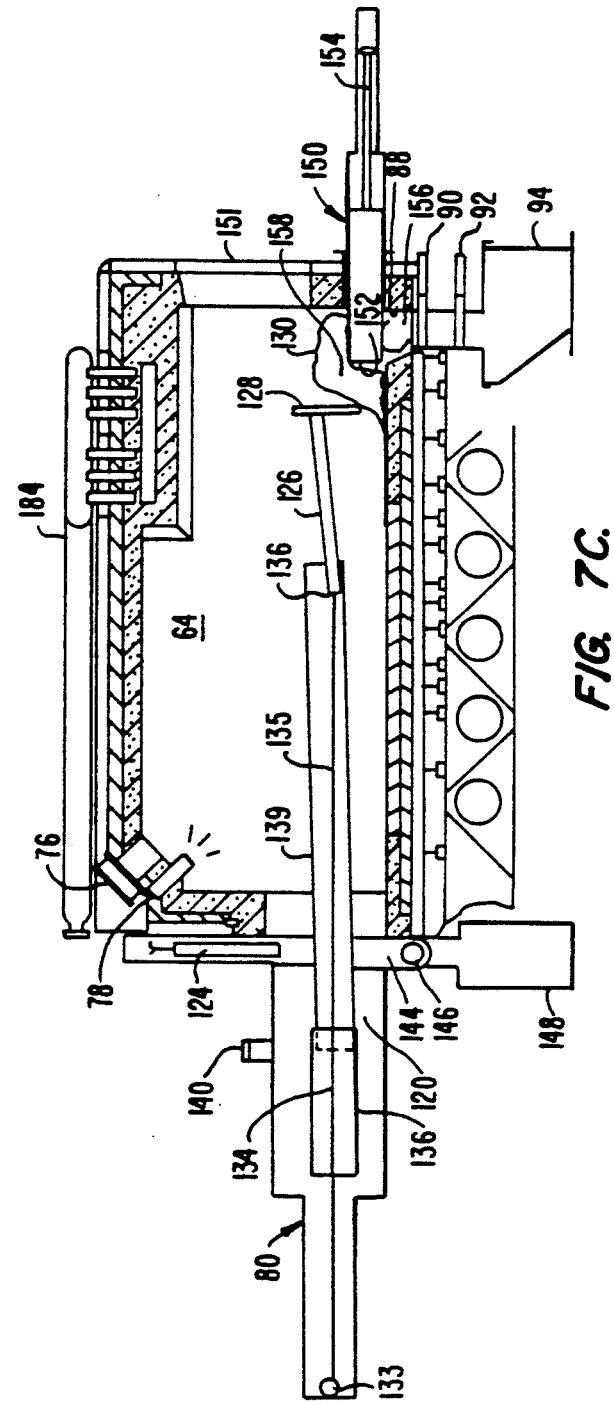
FIG. 7A.
FIG. 7C.

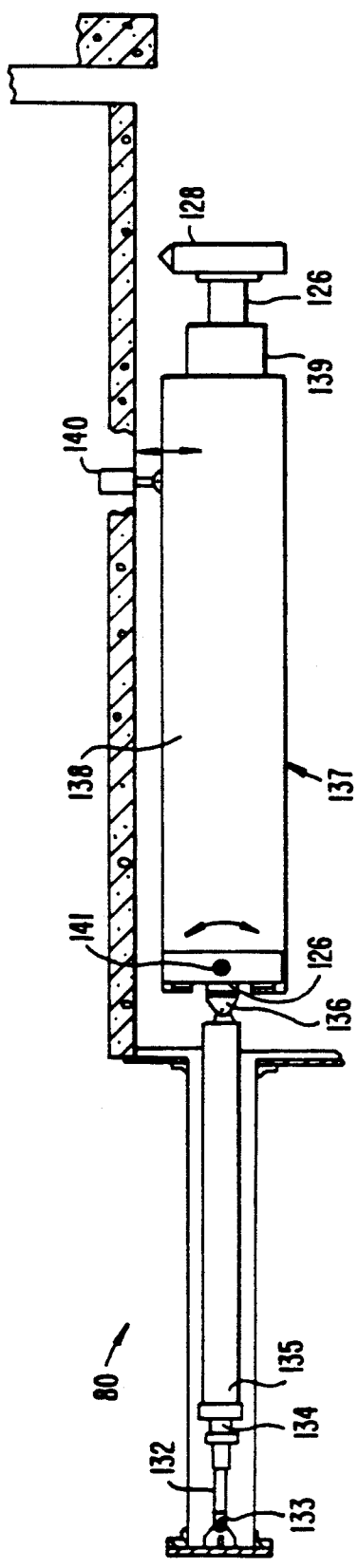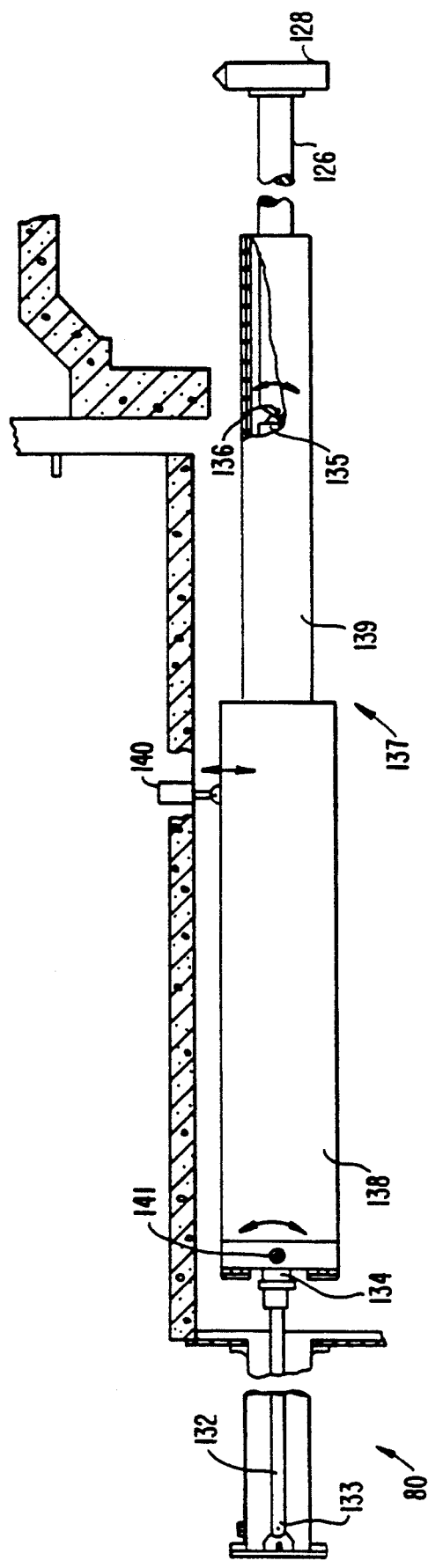

RESOURCE RECOVERY SYSTEM

This invention lies in the field of solid rocket propellants and related compositions, and relates to methods for the disposal of waste compositions of this nature and the reclamation of useful materials.

BACKGROUND OF THE INVENTION

Energetic compositions such as those used as explosives and propellants present a well-recognized problem when it becomes necessary to dispose of such materials as waste. Solid rocket propellants are a prominent example, and a common instance in which the disposal problem arises is the regraining of rocket motors for reuse. This is one of numerous situations in which the propellant compositions used as rocket motor grain, and similar materials, must be disposed of in an acceptable manner. For environmental considerations, such methods as open-pit burning into the atmosphere are not acceptable. For example, unacceptable quantities of HCl, $NO_x$ and CO are emitted into the atmosphere during open-pit burning. Furthermore, if waste compositions of this nature are to be stored and handled, a serious risk of initiation from external influences such as an inadvertent impact or an accidental discharge is present. Clearly there is a need for safe and environmentally acceptable methods of disposing of waste rocket propellants and similar compositions.

In addition, the recycling of materials or the reclamation of value and use from them in one form or another is always a desirable goal. This is true of all components of energetic compositions, both organic and inorganic. However, reclamation of useful materials when disposing of rocket propellant by open field burning is generally not possible. For example, aluminum powder and ammonium perchlorate, components widely used in these compositions, are lost in open field burning, thereby eliminating recycling benefits.

SUMMARY OF THE INVENTION

The present invention is directed to a system that avoids the problems and disadvantages of the prior art. The system provides a method to safely remove rocket propellant, process it, recover valuable aluminum and oxidizer (e.g., ammonium perchlorate), and incinerate the remaining solids in a totally, environmentally sound manner as discussed below.

Rocket propellant is removed from the casing of a rocket motor by hydromining in which a high pressure water stream is used to cut the propellant out of the rocket motor. During this cutting process, a first quantity of the oxidizer is removed as the water leaches the oxidizer from the propellant. The large chunks that come out of the hydromining process are processed by a series of high speed underwater maceration operations. The propellant chunks are initially ground to about ¾ inch particles which are eventually ground to particles of about ⅛ inch in size. During this underwater grinding more oxidizer is leached from the propellant into the water, thereby increasing ammonium perchlorate recovery. In this way, more than 85% by weight of the ammonium perchlorate in the rocket propellant can be recovered. The ⅛ inch particulate contains mostly aluminum and binder matrix, and thus can be classified as nonhazardous waste. In that form, it is also very easy to burn in a controlled manner.

The ⅛ inch particulate is thermally treated in an incinerator at a temperature of about 1,800°–2,000° F. in a reducing atmosphere to recover the aluminum as very high purity aluminum oxide. The very low level of oxidizer and the relatively small particle size (about ⅛ inch) of the treated propellant, allow the burning process to be accurately controlled.

Another advantage of the system is that all the grinding and cutting of the propellant is done under water. Not only does this facilitate extraction of the oxidizer, it minimizes the possibility of propellant ignition during the propellant removal and size-reduction steps.

The above is a brief description of some deficiencies in the prior art and advantages of the present invention. Other features, advantages and embodiments of the invention will be apparent to those skilled in the art from the following description, accompanying drawings and appended claims.

BRIEF DESCRIPTION OF THE DRAWINGS

FIG. 7A is a top plan view of the incinerator airlock and primary combustion chamber illustrating the propellant feed ram in the retracted position;

FIG. 7C illustrates the primary combustion chamber of FIG. 6A with the feed ram tilted for retraction;

FIGS. 7D and 7E are enlarged views of the feed ram assembly in the retracted and extended positions respectively;

DESCRIPTION OF THE PREFERRED EMBODIMENT

Figure 1:
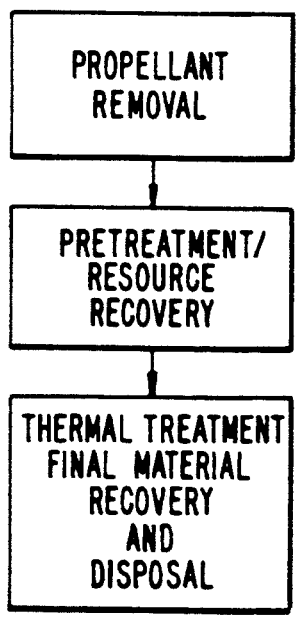
FIG. 1 is a block diagram of the resource recovery system in accordance with the principles of the present invention.

Referring to the drawings in detail wherein like numerals indicate like elements, the resource recovery system is shown in accordance with the principles of the present invention. While the description of the preferred embodiment addresses solid rocket propellant in detail, and specifically solid rocket propellant containing ammonium perchlorate oxidizer, it should be understood that the present invention applies to energetic compositions in general which contain aluminum particles, a binder and any suitable oxidizer.

Referring to FIG. 1, the basic process steps are diagrammatically illustrated. Solid rocket propellant is removed from the casing of a rocket motor. Then, the propellant is pretreated in a process in which oxidizer is removed and recovered from the propellant. The resultant material is then thermally treated and aluminum oxide is subsequently recovered. The oxidizer content is significantly reduced during pretreatment to provide a much less energetic material. This, plus the use of a reducing atmosphere in the primary combustion chamber of the thermal treatment system (described below), give rise to lower temperature combustion which minimizes the formation of nitrogen oxides ($NO_x$), Removal of the oxidizer may be achieved by conventional means, such as solvent extraction, physical means of separation, and any other means which will remove most of the oxidizer from the composition. Solvent extraction is generally the most convenient and expedient means, the choice of solvent depending on the solubility properties of the oxidizers relative to those of the binder. For oxidizers which are at least partially water-soluble, water is a preferred solvent due to its safety, ease of use and the low cost. Ammonium perchlorate (AP), for example, can be extracted with water as well as aqueous ammonium hydroxide and liquid ammonium. Water is particularly convenient since it may also be used as a high pressure jet to remove the composition from a rocket motor as the first step in preparing the composition for treatment and conversion according to the process of this invention.

Figure 2:
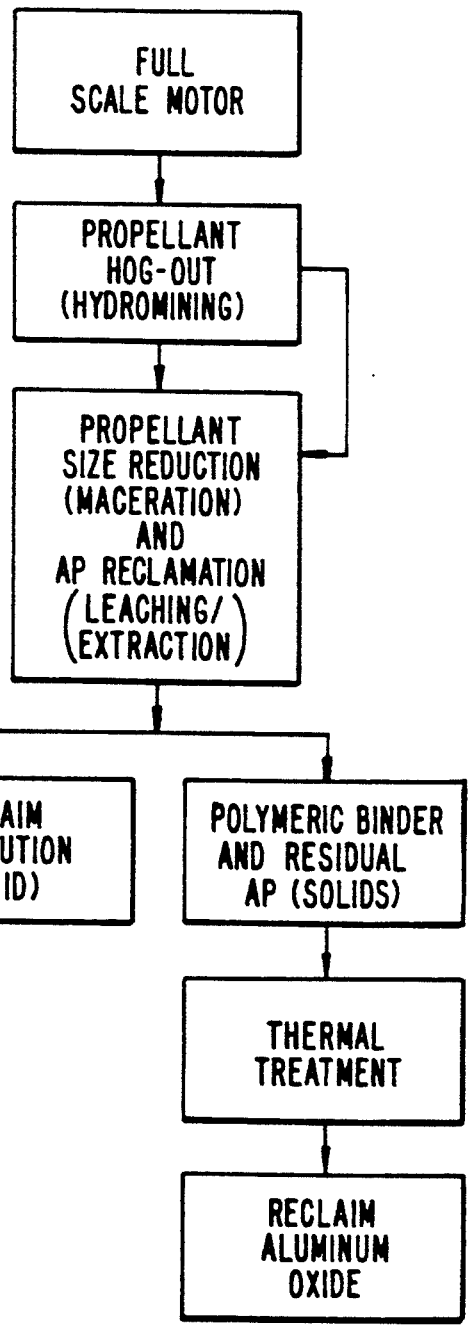
FIG. 2 illustrates the diagram of FIG. 1 in further detail.

Referring to FIG. 2, this application of high-pressure water to the rocket motor to remove the propellant grain is known in the industry as hydromining or "hog-out" of the propellant. This procedure itself causes extraction of a portion of the ammonium perchlorate oxidizer. After hog-out, the propellant is macerated and further leached with more water to remove any remaining oxidizer. The ammonium perchlorate solution is reclaimed and the remaining aluminum, polymeric binder and residual ammonium perchlorate material is thermally treated and aluminum oxide recovered. The ammonium perchlorate solution can be sold to commercial manufacturers or recycled back to the ammonium perchlorate suppliers for crystallization and subsequent use in rocket propellant.

Figure 3A:
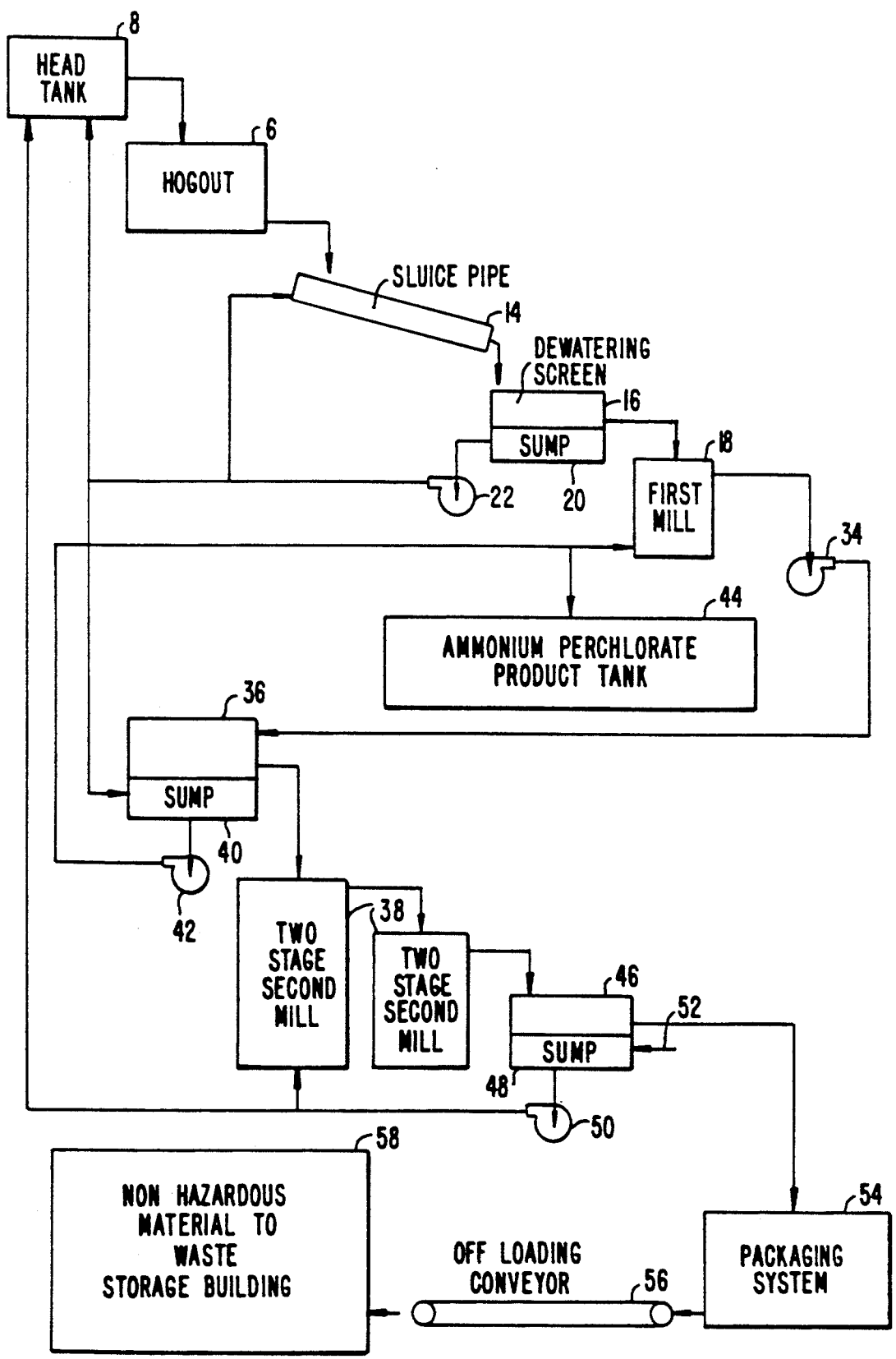
FIG. 3A is a schematic representation of the propellant removal and treatment process according to the present invention.
Figure 3B:
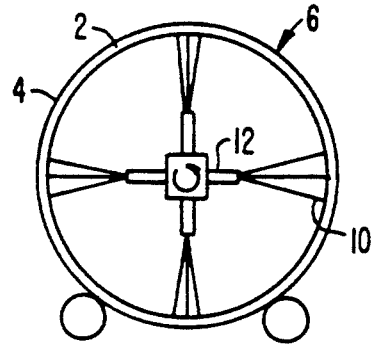
FIG. 3B is a schematic representation of the rocket propellant removal system.
Figure 3C:
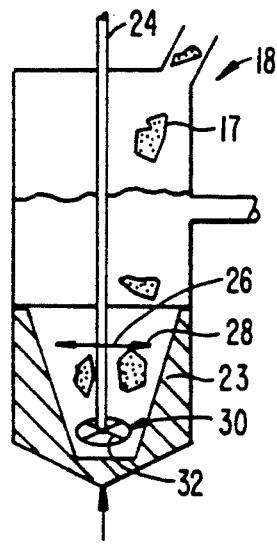
FIG. 3C is a simplified cross-sectional view of the first mill of FIG. 3A.

Referring to FIGS. 3A-C, the process for treating the rocket propellant prior to thermal treatment is diagrammatically shown. The rocket propellant 2 is removed from the casing of the rocket motor 4 at a hog-out station 6. The head tank 8 which supplies fluid to the hog-out station initially holds water. However, due to recirculation of ammonium perchlorate solution back to the head tank, as will be discussed below, the head tank subsequently holds a dilute ammonium perchlorate solution. At the hog-out station or facility (schematically illustrated in FIG. 3B) a high pressure water stream 10 of about 7,000 lb. per sq. in. is used to cut the propellant out of the rocket motor. As is conventional in the industry, a number of nozzles 12 are placed inside the motor casing for rotation and translation therein to effectively remove the rocket propellant. During this cutting process, some of the oxidizer is removed. It has been observed that 40 to 50% of the oxidizer can be removed during this process.

The ammonium perchlorate solution, together with the large chunks that come out of the hog-out process (which can be 3 cubic inches or larger) are fed to the sluice pipe 14 which can be 125 feet long to gravitationally convey the hog-out materials to a safe quantity distance (QD) from the hog-out facility. The solid material is separated from the ammonium perchlorate solution using a conventional vibrating dewatering screen 16. Such watering screens are commercially available, for example, from Kason Corporation of Linden, N.J. The solid material that is separated from the ammonium perchlorate solution at the vibrating dewatering screen is discharged into a high speed shredding mill 18. The water containing ammonium perchlorate is collected in sump 20 and returned via pump 22 to the sluice pipe inlet for recirculation in sluice pipe 14 to assist in conveying the propellant chunks down the pipe. The ammonium perchlorate solution also is returned via pump 22 to hog-out head tank 8 for reuse in propellant removal.

Figure 3D:
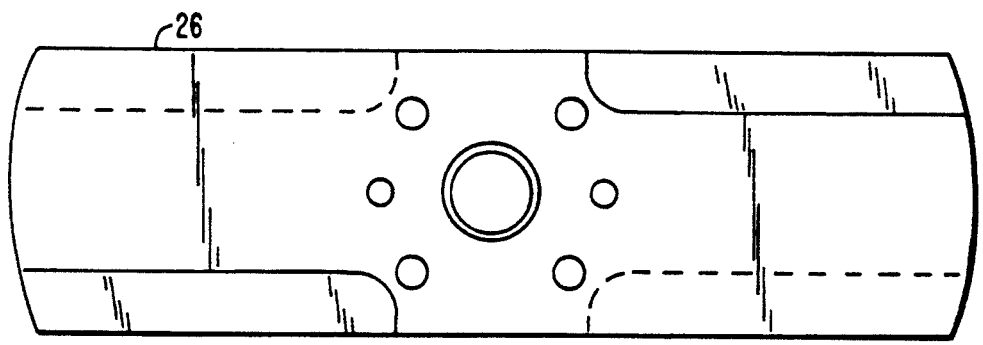
FIGS. 3D–3F are orthographic views of the top blade used in the first mill of FIG. 3C.
Figure 3E:
Figure 3F:
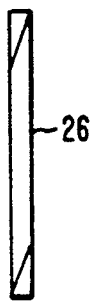

The hog-out material in mill 18 is shredded under a water solution which leaches the exposed ammonium perchlorate during shredding into a high concentration aqueous ammonium perchlorate solution (FIG. 3C). The solid material 12 is reduced in size into pieces about ⅜ inch in any dimension by two sets of cutting blades that are submerged in ammonium perchlorate solution and positioned in a conical housing 23. The blade assemblies are rotated by shaft 24 which is driven by a motor (not shown). Upper blade assembly 26, shown in more detail in FIGS. 3D-3E, includes a plurality of two sided blades 28 for coarse chopping, while lower blade assembly 30, such as those made by INDCO, Inc., as Designs A or B, includes an array of multi-edged blades for fine size reduction. These blade configurations are conventional in the industry for providing the course and fine grinding of material. The solid material overflows with the ammonium perchlorate solution into a slurry transfer which is pumped by pump 34 to vibrating dewatering screen 36. Screen 36 is similar to vibrating screen 16. The solids in the slurry are again separated from the ammonium perchlorate solution using vibrating screen 36 and dropped into a two-stage high shear shredding mill 38. The ammonium perchlorate solution is collected in sump 40 and returned via pump 42 to the ammonium perchlorate solution product tank 44 and to first mill 18 for recirculation through transfer pump 34.

The solid material dropped into two-stage mill 38 is shredded under a dilute ammonium perchlorate solution, which reduces the size of the material to approximately ⅛ inch particles suspended in the ammonium perchlorate aqueous solution. One suitable two stage-mill is available from Admix Company as model no. 160XP-148 Rotostat. The slurry is discharged onto vibrating dewatering screen 46, which is similar to screens 16 and 36, to separate the solid material from the ammonium perchlorate solution. The solution is collected in sump 48 and returned via pump 50 to two-stage shredding mill 38 for recirculation and to the existing hog-out facility for makeup liquid used during propellant removal from the motor casing. Makeup water indicated by arrow 52 is added to the two-stage shredding mill 38 to replace the liquid transfer to the hog-out facility. The makeup water is added in a countercurrent manner to the ammonium perchlorate solution to increase overall oxidizer extraction efficiency.

The material separated by the vibrating screen drops into a packaging system 54 which fills containers with the material, and preferably fills six gallon plastic containers or pails with about 50 pounds of desensitized material. The desensitized material has a moisture content between 30–50% by weight. The containers are sealed with a gasketed cover and conveyed via transfer system 56, for example, into storage building 58 for palletizing and storage. These filled containers are the feed charges 60 to the propellant thermal processor system illustrated in FIGS. 4–10. The plastic containers preferably are polyethylene and preferably have a 1/16 inch wall thickness. These containers do not leak like paper, and also burn readily in the incineration chamber.

Small amounts of the oxidizer may remain in the composition without serious detriment to the reclamation of the aluminum during thermal treatment. In general, however, it has been found that optimal results will be obtained when the oxidizer is reduced to about 15% by weight, and preferably less than about 10% by weight.

It is also preferred that the composition be chopped, shredded, ground, or otherwise reduced to a small particle size, to achieve uniform and rapid heat penetration during thermal treatment. Particles less than 3/16 inch in length, preferably about one-eighth inch in length, will generally provide the best results.

The final pretreatment particulate is more homogenous than the large chunks that initially come from the hog-out process. This eliminates possible excessive pressure and temperature excursions due to "Neat Propellant" in hog-out material. In turn, this saves down-time by reducing the time required for temperature and pressure controls to regain control of the process. In addition, maintenance down-time for continual repairs to incinerator refractory caused by temperature excursions and explosions is minimized or eliminated.

For this example case, since approximately 85% or greater by weight of the ammonium perchlorate in the propellant is removed as ammonium perchlorate solution, the residue is nonhazardous, eliminating RCRA permitting for the incineration system. Savings in time delays and monthly reporting costs associated with RCRA procedures also are realized. This pretreatment also eliminates the need for costly exhaust gas analysis required by RCRA for hazardous waste incineration. In addition, the down-time for calibration and repair of fragile gas analysis hardware whose continuous data monitoring is required by regulation during the process (about 10% of operating time) is eliminated.

Another important result of the pretreatment of the propellant before incineration is that by reducing the quantity of ammonium perchlorate from the propellant, the pretreatment has reduced the quantity of chlorine/hydrogen chloride gas in the incinerator because ammonium perchlorate is the only source of chlorine in the hog-out material. This reduction in acid gases minimizes corrosion of equipment (reduces maintenance) and reduces waste from the incineration system by reducing the quantity of acid gases cleanup. These savings are both in the cost of caustic used to neutralize the acid gas and in the reduction of the cost to treat and ship the respective scrub solution waste produced during the acid gas neutralization discussed below. For example, for an incineration system having a capacity of about 2,000,000 pounds of propellant per year, the savings in caustic used is 100,000 gallons per year and the savings in scrub solution is about 275,000 gallons per year.

The final ammonium perchlorate solution containing approximately 85% or greater by weight of the ammonium perchlorate from the propellant can be recycled for various uses. For example, the ammonium perchlorate can be recycled for use in slurry explosives or for use in another rocket motor. In addition, potassium can be reacted with ammonium perchlorate to form potassium chlorate, which can be used in the manufacture of batteries.

Figure 4:
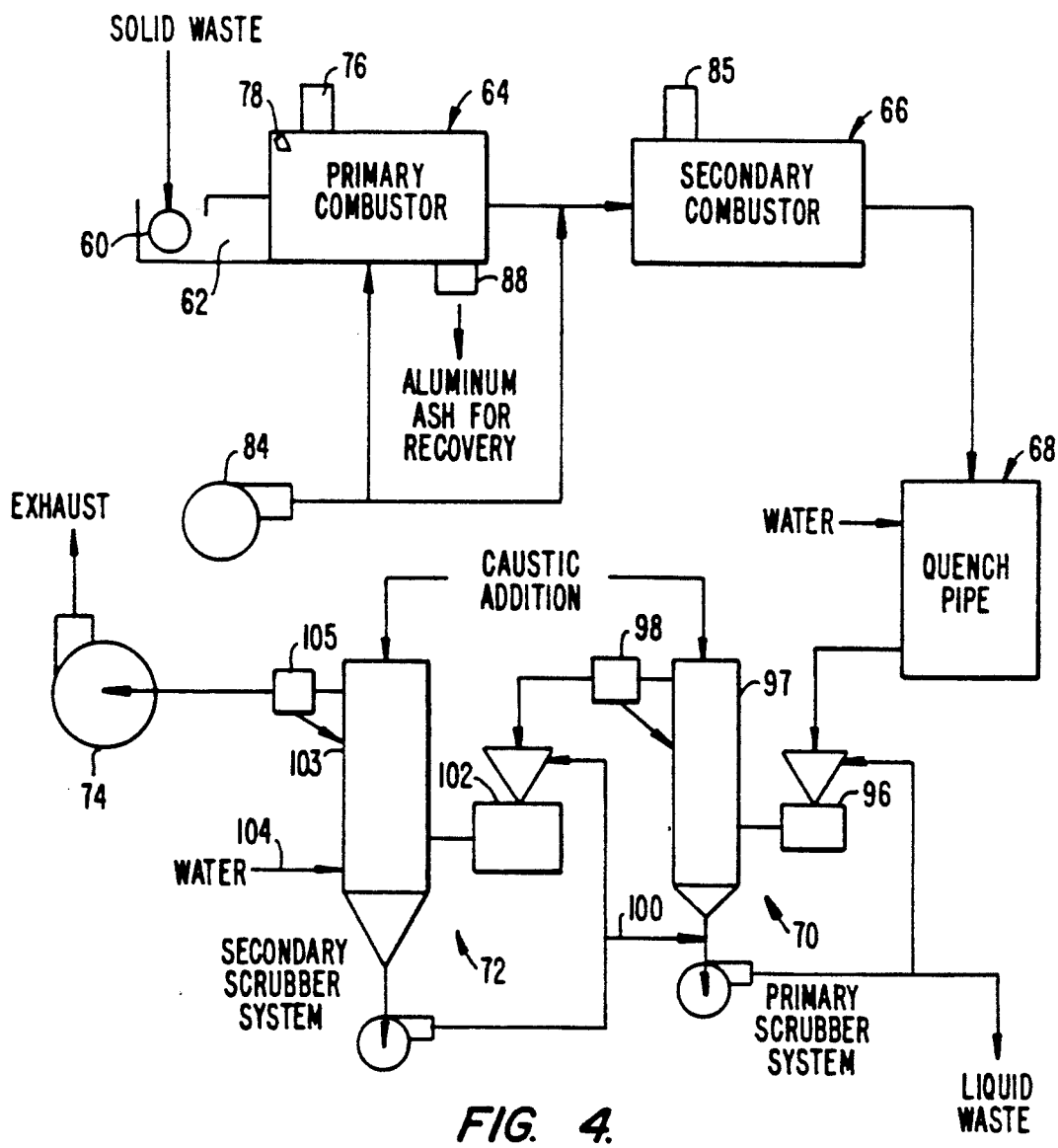
FIG. 4 is a schematic representation of the propellant thermal treatment process.
Figure 6A:
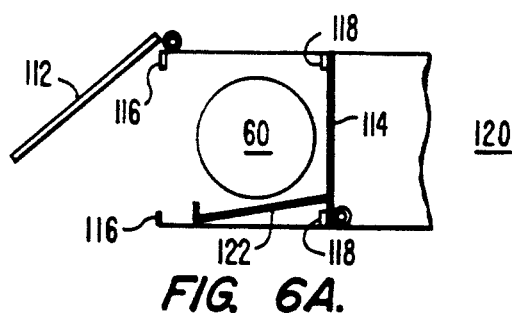
FIGS. 6A, B and C are schematic representations of the incinerator air lock chamber illustrated in FIGS. 4 and 5 showing a feed sequence.
Figure 6B:
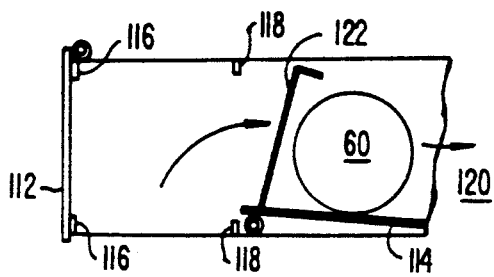
Figure 6C:
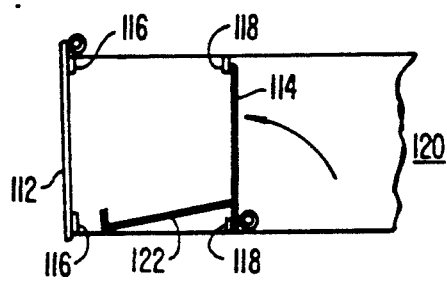
Figure 5A:
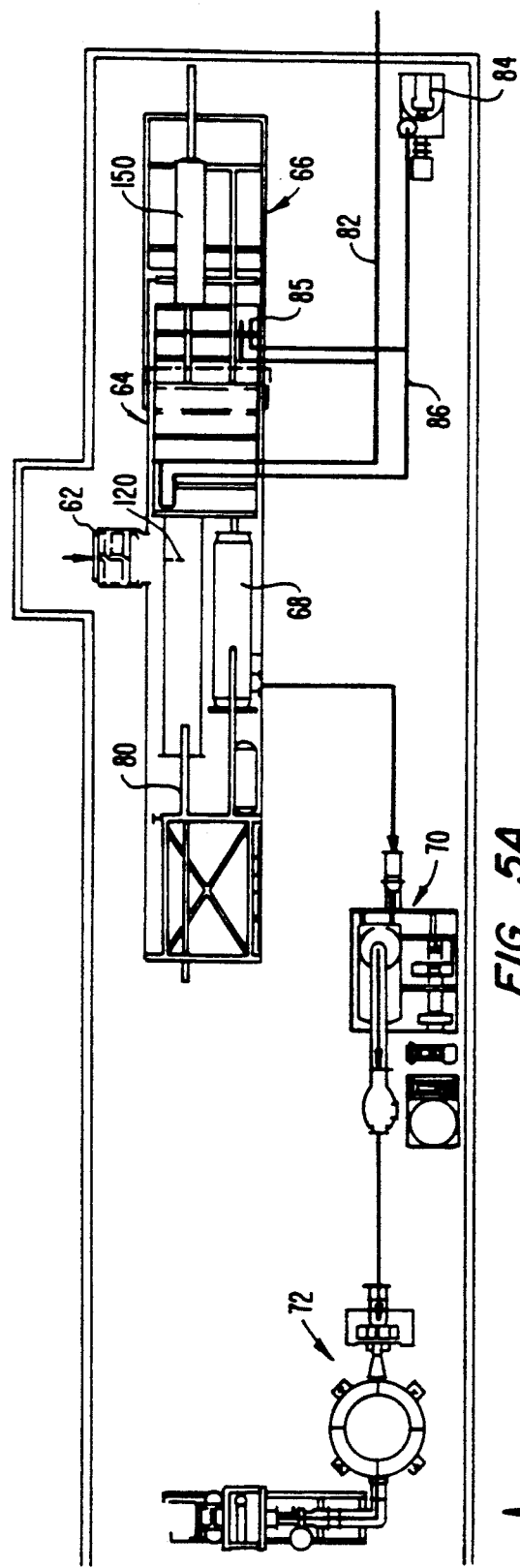
FIG. 5A is a top plan view of the incinerator and scrubber system.
Figure 5B:
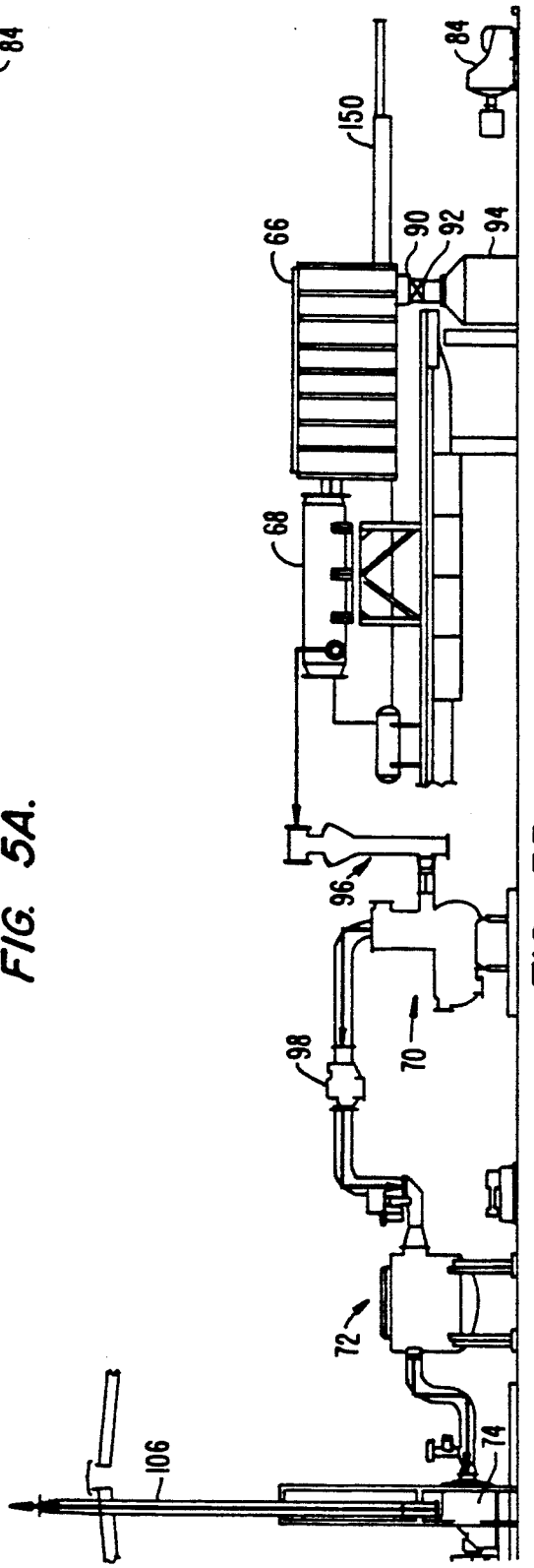
FIG. 5B is a side elevational view of the system of FIG. 5A.

FIGS. 4–11 illustrate the thermal processing system for the final pretreatment particulate. Referring to FIGS. 4 and 5, feed charges 60 are fed through airlock feed chamber 62 into the thermal processing system which includes primary and secondary combustion chambers 64, 66, quench pipe 68, primary and secondary scrubbers 70, 72 and induction fan 74 which creates negative pressure in the system such that gases and suspended particles in the system flow downstream.

The feed charges 60 are placed one at a time into the airlock chamber 62. The feed charges 60 are physically pushed into the primary combustion chamber 64 one at a time by a feed ram assembly 80 discussed below. Once the feed charge 60 is positioned in the primary chamber, burner 76, having a construction conventional to those skilled in the art, is adjusted to control the primary combustion chamber temperature to a selected value within the range of about 1,800°–2,000° F. When the primary combustion chamber temperature rises above the selected value, aqueous waste solution or water is injected through spray nozzle 78 to maintain the selected temperature. Fuel is supplied to the burner via fuel supply conduit 82, which is coupled to a fuel supply (not shown), while air blower 84 supplies combustion air via combustion air conduit 86 to primary combustion chamber 64. However, the delivery of combustion air to the primary combustion chamber is controlled to give air-limited combustion and provide a reducing atmosphere, (i.e., there is not enough air in the primary chamber to combust with all of the materials that make up the propellant feed charge) to minimize oxygen available for the formation of $NO_x$. The solid and liquid wastes are decomposed to CO, $CO_2$, $H_2O$, partially oxidized organic compounds, acid gases, and ash. The volatile gases pass to secondary combustion chamber 66, which is maintained very air-rich and at a higher temperature (about 2,100° F.) by a secondary burner 85, via conduits branching from fuel supply and combustion air conduits 82, 86, see FIG. 5A, for the purpose of completing the oxidation of the gaseous and entrained solid combustion products. The induction fan 74 is controlled to provide a negative pressure in the system such that the gas residence time in the secondary combustion chamber 66 is greater than one-and-a-half seconds to complete the combustion process. The gas then leaves the secondary combustion chamber 66 and passes through a quench pipe 68 and a two-stage wet scrubber system for removal of acid gases and particulates.

Approximately 95 percent of the ash content of the incoming solid waste remains in the primary combustion chamber 64. Ash is gradually moved down the hearth of the primary chamber by the action of incoming feed charges 60 and the assistance of feed ram 80 assembly. Over a period of about four to five hours, a feed charge 60 progressively goes down the incinerator to ash discharge hole 88. The ash then drops through ash discharge hole 88 via a pair of hydraulically actuated knife valves 90 and 92 which are used as an airlock in the end of the primary combustion chamber farthest from the solid waste feeding door. After the ash passes through the air lock, it drops into ash container 94, which is preferably steel. In addition to causing gases to flow downstream in the system, the negative pressure caused by induction fan 74 in the system insures that if there is any leakage, that leakage is into the incinerator. Accordingly, smoke does not leave the incinerator. However, to have the ash properly exit the primary combustion chamber 64 and to minimize any leakage into the system, knife valve 90 is first opened and a charge of the ash is dropped between valves 90 and 92. Then, upper valve 90 is closed and bottom valve 92 opened to introduce the ash into sealed container 94 for removal and recycling of the aluminum and aluminum ash.

As described above, the hot gases flow from the secondary combustion chamber into quench pipe 68 where they are cooled to about 1,000° F. by the injection of atomized water. Quench pipe 68 comprises a cylindrical chamber that is refractory lined (as are the primary and secondary combustion chambers) and a water injection nozzle (not shown). The water nozzle uses air and an integral sonic resonator to produce extremely small water droplets which evaporate almost instantaneously.

The gases then enter venturi inlet 96 and pass into primary scrubber tank 97 of primary scrubber 70 where they are further cooled and scrubbed for acid gases (primarily HCl). The larger particulates are separated by contact with a recirculating stream of causticized concentrated scrub liquor. The gas-liquid mixture passes into a cyclonic separator (discussed in further detail with reference to FIG. 11) where the liquid phase collects, while the cooled, scrubbed gases flow through demister 98 and secondary scrubber venturi inlet 102 into secondary scrubber tank 103. The liquid level in the primary scrubber tends to decrease because of scrub liquor evaporation which occurs while cooling the hot incinerated gas in the venturi. This liquid loss is compensated by the continuous addition of makeup secondary scrub liquor through secondary scrubber solution transfer conduit 100. To assure efficient scrubbing of any acid gases in the incinerator exhaust, the scrub liquor is kept caustic (i.e., with a pH of approximately 7-10) by the addition of NaOH via a pH controller which modulates the caustic addition to primary scrubber tank 97 using a control valve.

The secondary venturi scrubber 72 performs a second-stage clean up of the gases from the primary scrubber 70. Secondary scrubber 72 has a construction conventional to those skilled in the art, operates at a much higher pressure drop than primary scrubber 70 (approximately 2.9 psi as compared to 1 psi) and utilizes a very dilute caustic solution as a scrub liquor (i.e., with a pH of approximately 7-10). The scrub liquor pH in the secondary scrubber is controlled by the addition of fresh water and NaOH solutions to secondary scrubber tank 103 as designated with arrow 104. The gases from the secondary scrubber pass through demisters 105 on their way to induction fan or discharge system 74. Demisters 98 and 105 are of the Chevron type and remove small droplets from the exiting scrub gas and return them to primary and secondary scrubber tanks 97 and 103, respectively. The induction fan draws the saturated gases from the secondary scrubber and compresses them to slightly above atmospheric pressure. The fan also heats the gases by adiabatic compression sufficiently to prevent any condensation from occurring during their passage through the exhaust stack 106.

The details of the airlock, primary combustion, and secondary combustion chambers are illustrated in FIGS. 6-10. Referring to FIGS. 6A, B, and C, airlock feed chamber 62 includes two hydraulically actuated hatch-type doors 112 and 114, which are pivotally mounted on the airlock chamber and fitted with positive sealing mechanisms 116 and 118. Outer airlock door 112 is opened during feed charge entry (FIG. 6A) and closed against seal 116 at all other times (FIGS. 6B and C). Inner airlock door 114 is closed against seal 118, except when feeding a charge 60 into the primary combustion chamber ram enclosure 120 (FIG. 6B). Inner airlock door 114 includes a feed plate 122 which is secured to inner airlock door 114 to automatically index the feed charge 60 into ram enclosure 120 when door 114 is opened. The volume between the outer and inner airlock doors is continuously purged and evacuated into the combustion air supply (which is at a lower pressure) to the incinerator by a conduit (not shown) coupling the area between doors 112 and 114 with combustion air conduit 86. In this way, any smoke or combustion gas that enters the airlock chamber is evacuated back into the incinerator. The airlock chamber thus provides positive isolation of the incinerator from the ambient environment during both feeding and normal operation, and thereby permits the combustion chambers to be maintained slightly below atmospheric pressure.

Figures 7B, 8:
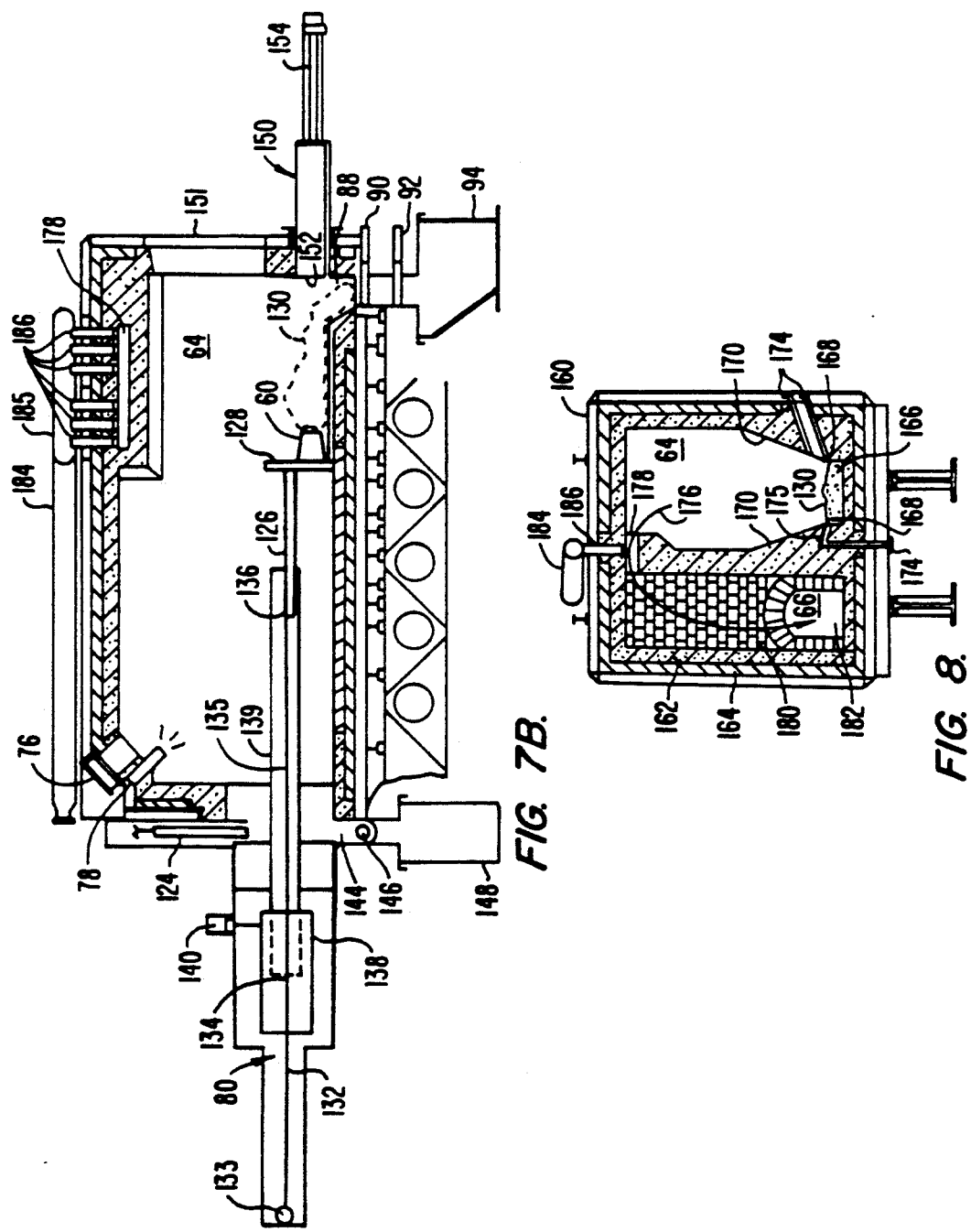
FIG. 7B illustrates the primary combustion chamber of FIG. 7A with the feed ram in the extended position.
FIG. 8 is a sectional view of the incinerator illustrated in FIGS. 5A, 5B.

Referring to FIG. 7A, when the feed charge 60 is initially positioned in primary chamber ram enclosure 120, guillotine refractory door 124 (fire door) is closed to isolate the feed charge and prevent the relatively high temperatures in the primary combustion chamber from reaching the feed charge too early. Then the fire door 124 is raised by conventional means (e.g., pulleys, hydraulics, etc.) such that feed ram 126 of hydraulic feed ram assembly 80 can be extended with plow 128 pushing the feed charge 60 into the hearth of primary combustion chamber 64 (FIG. 7B). In this way, the feed charge 60 pushes ash pile 130 toward ash container 94. Referring to FIGS. 7A-E, feed ram assembly 80 is a three-stage assembly including an innermost piston 132 pivotally fixed at one end of a pivot 133, an intermediate cylinder 134 surrounding piston 132, an outer cylinder 135 surrounding cylinder 134 and a feed ram 126 pivotally secured to the outer end of outer cylinder 135 at a pivot 136. While one end of feed ram assembly 80 is supported by pivot 133, the other end is supported within a two stage telescoping guide boom 137. Guide boom 137 includes an outer guide boom 138 and an inner guide boom 139 which telescopically extends from one end of boom 138. Outer guide boom 138 is supported at its one end by a hydraulic ram 140 which raises and lowers the one end of boom 138 while the other end is pivotally secured in place at a pivot 141.

Actuation of feed ram assembly 80 causes cylinders 134, 135 to extend within guide boom 137. This movement causes appropriately positioned stops (not shown) mounted to outer cylinder 135 and inner guide boom 139 to engage moving boom 139 from the retracted position of FIG. 7D to the extended position of FIG. 7E. This helps to ensure that the other end of outer cylinder 135 and the adjacent end of feed ram 126, which are joined at pivot 136, are supported vertically throughout the movement of feed ram assembly.

Plow 128 can thus be lowered for entry into the hearth and raised for retraction. In this way, once the plow has pushed the feed charge and ash forward, it can be raised above the ash in the hearth during retraction to prevent ash from being dragged back behind the face of plow 126 and into the ram enclosure. In addition, the hydraulic feed ram assembly 80 is sufficiently spaced from primary combustion chamber 64 to protect bearings and dynamic elements therein from undesirable heat exposure.

During operation of the feed ram assembly 80, ash which falls behind the plow or ram face 128 during entry into the incinerator can settle under fire door 124. This can prevent fire door 124 from fully closing, which can cause high temperatures in the ram enclosure and feed chamber area. In turn, the high temperature can destroy many of the components in the feed chamber area, such as bearings, hydraulic seals, and electrical switches. The pivoting feature of the feed ram 126 substantially reduces the quantity of ash drag-back. However, some ash can fall behind the face of ram plow 128 and be dragged back during retraction and settle under fire door 124. Accordingly, the primary combustion chamber 64 is provided with ash trough 144 that extends the width of the chamber underneath fire door 124. A conveyor screw 146 is positioned in ash trough 144 to convey ash trapped in trough 144 through a valve (not shown) and into a sealed container 148. Container 148 can be decoupled from the valve and, thus, removed and replaced without shutting down the incinerator system. Accordingly, incineration shut down for ash clean up underneath fire door 124 is avoided.

A stoking ram 150 is positioned at the other end of the primary combustion chamber with a sealed inspection window 151 thereabove. Stoking ram assembly 150 includes ram head 152, which is reciprocated by a hydraulically-actuated piston, such as piston 154, as is conventional to those skilled in the art. Thus, ram head 152 can be extended to stoke the ash, or as illustrated in FIG. 7C, extended to protect cooled ash pile 156 from hot ash 158 that is pushed toward discharge port 88 above knife valve 90. In this way, the temperature of the ash fed into ash container 94 can be controlled. In addition, cooling air can be provided in the area immediately above the top valve knife 90 by an air distribution pipe coupled to an orificed header to supply controlled air to cool the ash.

Sonic water injection nozzle 78 also is shown in FIGS. 7B and C. This nozzle uses air at sonic velocity to atomize the water into a very fine fog, which flash evaporates in the incinerator, cooling the chamber without thermally shocking the refractory. The nozzle assembly is enclosed within a concentric pipe (not shown), which is air purged to provide temperature protection for the nozzle when not operational. This purge circuit also provides directional velocity past the nozzle points and prevents dust containing incinerator gas from recirculating past the nozzle ports causing plugging in the nozzle. The nozzle construction is conventional in the industry.

Referring to FIG. 8, both the primary and secondary combustion chambers 64 and 66 are fully refractory-lined chambers which are housed side-by-side within a common steel shell 160. High density refractory 162 surrounds each chamber. These refractory linings are backed up by a low density block insulation 164. Refractory 162 forms the hearth of the primary combustion chamber. The hearth includes a trough comprising a base 166 and side walls 168 which extend generally perpendicular to base 166. The generally rectangular trough preferably is centered in the hearth to optimize fluid flow discussed below. The trough is 18 inches wide, 6 inches high and about 15 feet long.

Refractory walls 170 extend from side walls 168 in a diverging manner. Preferably refractory walls 170 are symmetrically positioned about the center of the hearth and form an angle with side walls 168 (i.e., the vertical) of at least about 20 degrees. For the above-recited example, the upper portions of refractory walls 170 are spaced from one another by about 3 feet. In other words, the maximum width of the primary chamber is about 3 feet.

An air header 172, located outside of the incinerator (FIG. 9), feeds combustion air to air injection nozzles or pipes 174 which extend through metal containment shell 160 and refractory 162 to a position immediately above side walls 168 of the refractory trough. If the air stream were to enter the hearth at a position spaced from the ash pile, it would heat up and rise before contacting the ash. It has also been observed that if the refractory walls 170 were not inclined, such that the width of the combustion chamber remained constant, there would be an increased updraft that would carry some of the ash into secondary combustion chamber 66 as opposed to being discharged through the ash discharge port for recycling. With the above construction, the ash pile is made as small as possible due to the narrow configuration of the refractory trough, and air is introduced immediately adjacent to the ash pile to efficiently burn the feed materials.

Figure 9:
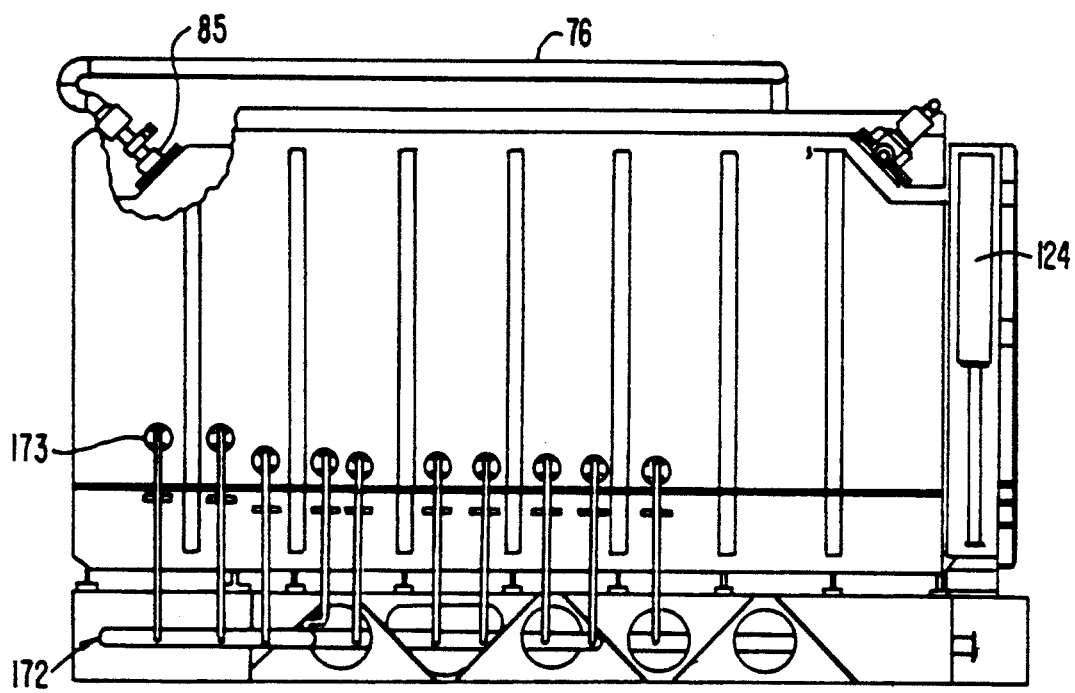
FIG. 9 is a side elevation of the incinerator illustrated in FIGS. 5A, 5B.
Figure 10:
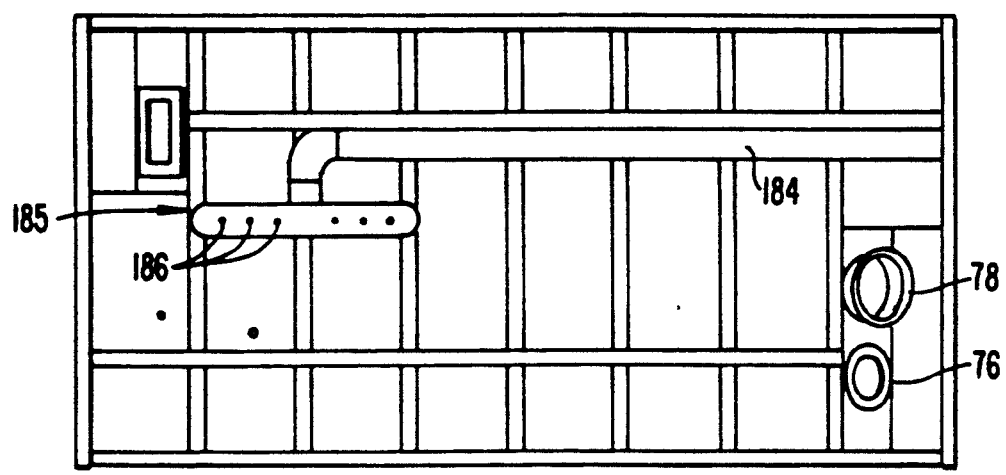
FIG. 10 is a top plan view of the incinerator illustrated in FIGS. 5A, B.

The air injection nozzles on the side of the hearth opposite the secondary combustion chamber form an angle of at least about 10 degrees with the horizontal, while the air injection nozzle that extends through refractory positioned between the primary combustion chamber hearth and the secondary combustion chamber includes an end portion 175 from which the air exits that is also at least about 10 degrees from the horizontal. It has been found that such an angle prevents molten materials from backing up into the air injection nozzles 174, as any such molten metal drains back out into the refractory trough. In this way, the nozzles are not blocked and combustion air is introduced efficiently to the molten material in the hearth. In addition, the pipes penetrate the refractory at a downward angle to the top of the refractory trough. This minimizes the distance between the burning feed and the air introduction ports of the air injection pipes 174. Further, each air injection pipe is fitted with a removable section 173 (which can be releasably secured to the incinerator and header 172 by conventional fasteners or other conventional means) to provide clean-up capability from outside of the incinerator (FIG. 9). The removable section of header also is provided with adjustable orifices (not shown) to provide a mechanism for adjusting flow rate at a particular nozzle, and, thus, the distribution of combustion air along the length of the hearth. Accordingly, when burning high viscosity, slow burning material, the combustion air can be increased along the central region of the hearth as opposed to the feed end or ash discharge end. In other words, the air distribution can be tailored for feeds which are difficult to burn.

The gas flow from primary combustion chamber 64 to secondary combustion chamber 66 is illustrated by the arrow designated with reference numeral 176. Thus, the gases first flow into a transfer channel 178 and then into the secondary chamber where wall 180, preferably brick, forms a baffle that redirects the gas flow downwardly to an opening 182 formed in the bottom portion of the baffle and in the lower region of secondary combustion chamber 66 where the gases pass through and flow through the remaining portion of the secondary chamber for final thermal treatment. Baffle 180 ensures that the gases have a residence time in the secondary combustion chamber of at least about one and one-half seconds to provide complete combustion. Preferably, the baffle is positioned at about the mid-point of the secondary combustion chamber as measured in the longitudinal direction. Combustion air for the secondary chamber is provided through conduit 184 (FIGS. 7a-c; 8 and 10). Combustion air conduit 184 feeds air distributor 185 having a number of ports 186 spread across and in fluid communication with the narrow transfer channel 178. This configuration assures complete mixing of the combustion air supplied to the secondary combustion chamber through conduit 184 with the exhaust of the primary combustion chamber. The secondary chamber temperature is maintained at 2100° F. by modulating the output of the secondary chamber burner 85. The baffle 180 also provides a method of additional mixing of the gases to complete the oxidation process in the secondary combustion chamber.

Figure 11:
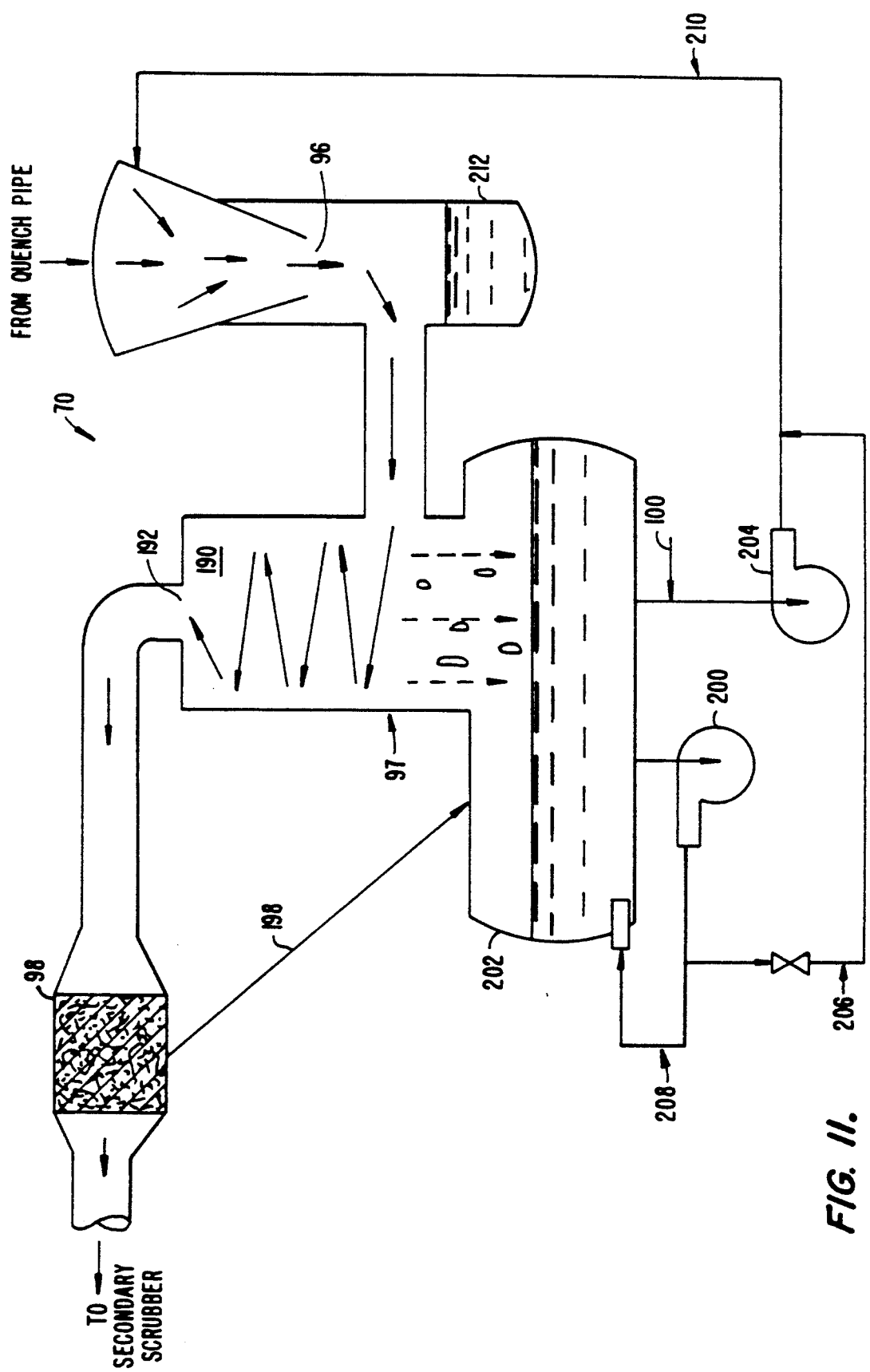
FIG. 11 is a schematic illustration of the primary scrubber system illustrated in FIGS. 5A, 5B.

Referring to FIG. 11, the gases from the secondary combustion chamber enter the primary scrubber system at a temperature of about 1,000° F. after being treated by quench pipe 68. Thus, the primary scrubber operates at a very high gas inlet temperature. It utilizes this heat to evaporate the scrubbing liquid wastes generated from the gas cleanup system. Unlike conventional venturi scrubbers, which operate at less than 1% solids in the scrubbing system which results in high quantities of waste scrub solution, the primary scrubber 70 can operate as high as 25% solids in the system because the scrubbing solution is not atomized through conventional small orificed nozzles where the high velocity scrubbing liquid is injected perpendicular to the gas flow to cause the scrubbing action. Rather, the scrubbing liquid is allowed to flow slowly down the throat of the venturi and is shear atomized by the high velocity gas. The high efficiency direct contact system is discussed below.

Referring to FIG. 11, the gases from the scrubber throat enter the primary liquid/gas separation system 70 through an inlet nozzle 96 to accelerate the gases. The accelerated gases then tangentially enter the cyclonic disentrainment chamber 190 where they rise in a cyclonic path, while heading for the cyclonic chamber outlet port 192. As the gases rise in the cyclonic disentrainment chamber, liquid droplets 194 suspended in the gas collide against the walls and fall downwardly as designated with arrow 196 in FIG. 11. Any liquid that escapes cyclonic disentrainment is captured in demister 98 and returned to the scrubber tank as designated by arrow 198. Munters Corporation of Fort Myers, Fla. is one manufacturer of such demisters.

An agitation pump 200 is also provided to maintain the particulate in suspension and then return that fluid to sump 202 of scrubber tank 70. A recirculation pump 204 also is provided which interconnects the liquid in the primary scrubber tank with the inlet pipe 96 of primary scrubber 70. A backup circuit 206 can be provided which interconnects the agitation pump circuit 208 to the recirculation pump circuit 210 when the recirculation pump is inoperable. Although a negative pressure in the system continuously draws the gases and particles downstream as discussed above, some of the particles pass the tangential pipe entry. Therefore, a liquid reservoir 212 is provided below inlet nozzle 96 as illustrated in FIG. 11, to remove particles which could travel in excess of 150 mph and directly hit and abrade the inner walls of the scrubber. Such stray particle liquid reservoir traps are conventional in the industry.

As discussed above, the primary scrubber is operated in series with a very high efficiency conventional venturi scrubber (secondary scrubber 72) which captures any particulate leaving the primary scrubber. The scrubbing solution from the secondary scrubber is used as a make-up liquid via transfer conduit 100 for the primary scrubber, which needs liquid due to the large quantity of evaporation which occurs. Both of these scrubbers have the capability of variable differential pressure drop across their respective throats by varying the flow of scrubbing liquid to the throat. By adjusting the differential pressure drops, the two scrubbers in combination can be tuned to the specific requirements of the gas cleanup system by changing the respective pressure drop at each scrubber. It has been found that this primary and secondary scrubber combination can capture more than 95% submicron particulates, achieves less than 0.005 gr/DSCF particulate release, captures greater than 99% of the acid gases, minimizes liquid waste generation, and recovers energy by concentrating the liquid waste through waste heat recovery.

Finally, the pressures within the system components may be selected from a wide variety of ranges to provide the negative pressure discussed above. Merely to exemplify a preferred set of pressures, assuming atmospheric pressure at 14.7 psia, the following example may be recited. Primary combustion chamber 14.6 psia; secondary combustion chamber 14.5 psia; quench pipe 14.3 psia; primary scrubber tank 185° F., 13.6 psia; secondary scrubber tank 165° F., 10 psia.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specifications should not be construed to unduly narrow the full scope of protection to which the invention is entitled.

The specific binder in the composition is not critical and may vary. It may, for example, be any of the wide variety of polymeric binders used in solid rocket propellants, used either individually or in combination. Examples are polybutadienes such as hydroxy terminated polybutadiene (HTPB) and carboxyl-terminated polybutadiene (CTPB), acrylic acid/acrylonitrile/butadiene terpolymer (PBAN), and epoxy resins. Among these examples, those in particularly prominent use are HTPB, CTPB and PBAN.

Likewise, the specific oxidizer is not critical and may vary widely. The only requirement is that the oxidizer be soluble in the extraction solvent. Examples here as well include any of the wide variety used in solid rocket propellants, either alone or in combination. These include ammonium perchlorate (AP), ammonium nitrate (AN), cyclotrimethylene trinitramine (RDX), cyclotetrimethylene tetranitramine (HMX), and nitroglycerine (NG).

The composition will also often contain additives in minor amounts, such as cure promoters, stabilizers, burning rate accelerators, thixotropic control agents, or modifiers of the polymer, as well as combinations of such materials. The selection and amounts of these additives will vary depending on the particular binder used, and the source of the composition. Essentially any of these materials may be included in the composition without substantial detriment to the process of the invention.

The aluminum particle size may vary as well, but will generally fall within the range of about 5 microns to about 60 microns.

The relative amounts of the components in the composition will vary as they do in the industry and as disclosed in the literature. These variations and the range of proportions are generally known among those skilled in the art. The effect of these variations on the process of the present invention will be differences in the amount of aluminum and oxidizer recovered.

What is claimed is:

1. A process for recovering aluminum oxide from rocket propellant comprising the steps of:
   providing a quantity of rocket propellant comprising a binder, aluminum and an oxidizer;
   removing oxidizer from said quantity of rocket propellant to yield a material comprising aluminum and oxidizer in an amount less than or equal to about 15% by weight of the material;
   thermally treating said material in a combustion chamber at a reducing atmosphere to essentially yield aluminum oxide particles; and
   collecting the aluminum oxide particles directly from the combustion chamber.

2. The process of claim 1 wherein the removing step includes reducing the rocket propellant into particulate having a particle size of about ⅛ inch.

3. The process of claim 2 wherein the oxidizer removing step comprises extracting the oxidizer with water.

4. The process of claim 3 wherein the oxidizer comprises ammonium perchlorate.

5. The process of claim 1 wherein the removing step comprises extracting the oxidizer with water.

6. The process of claim 1 wherein the temperature in the combustion chamber during thermal treatment of said material is maintained below about 2000° F.

7. The process of claim 1 wherein the temperature in the combustion chamber during thermal treatment of said material is maintained in the range of about 1800°-2000° F.

8. The process of claim 1 wherein the thermal treatment includes introducing air streams into the chamber at a location immediately adjacent to material and directing the air streams downwardly toward the propellant.

9. The process of claim 8 including selectively controlling the flow rates of the individual air streams to control the air distribution along the hearth of the combustion chamber to control the burn rate of said material positioned in different regions of the hearth.

10. The process of claim 1 wherein the collecting step includes gravitationally feeding the aluminum oxide particles from the combustion chamber to a receptacle.

11. A process for recovering aluminum oxide from rocket propellant comprising the steps of:
    providing a rocket engine having solid rocket propellant comprising a binder, aluminum and an oxidizer;
    removing the propellant from the rocket engine such that a plurality of pieces of the propellant are formed;
    reducing the size of the propellant pieces and extracting oxidizer in a manner such that a mass of particulate comprising aluminum and having less than or equal to about 15% by weight oxidizer is formed;
    placing a quantity of the particulate mass in a chamber;
    thermally treating the particulate mass in the chamber at a reducing atmosphere to result in incomplete combustion of the mass to essentially yield aluminum oxide particles; and
    collecting the aluminum oxide particles from the chamber.

12. The process of claim 11 wherein the removing step comprises hogging out the rocket engine.

13. The process of claim 11 wherein the propellant pieces are reduced to particles of a first size at a first mill and then reduced to a smaller size at a second mill.

14. The process of claim 13 wherein each size reduction step is performed underwater, and oxidizer is extracted from the propellant by the water to form a solution comprising oxidizer and water.

15. The process of claim 14 wherein the particulate is separated from the solution after the first size reduction and the oxidizer recovered from the solution.

16. The process of claim 11 wherein the propellant pieces are reduced to particles of about ⅛ inch size.

17. The process of claim 11 wherein the propellant pieces are reduced to a particle size of about ¾ inch at the first mill and to a particle size of about ⅛ inch at the second mill.

18. The process of claim 11 wherein the particulate mass placed in the combustion chamber is packaged in containers.

19. The process of claim 11 wherein the particulate mass that is placed in the combustion chamber is packaged in plastic containers which undergo the thermal treatment with the particulate mass.

20. A method for recovering aluminum oxide from rocket propellant comprising the steps of:
    providing solid rocket propellant comprising a binder, aluminum and ammonium perchlorate;
    cutting the propellant and extracting ammonium perchlorate in a manner such that a mass of particulate, having about a ⅛ inch particle size, comprising aluminum, and having less than or equal to about 15% by weight ammonium perchlorate, is formed;
    placing a quantity of the particulate in a combustion chamber;
    thermally treating the particulate mass in the combustion chamber by maintaining the temperature in the chamber in the range of about 1800°-2000° F. while maintaining a reducing atmosphere therein to result in incomplete combustion of the mass to essentially yield aluminum oxide particles; and
    collecting the aluminum oxide particles directly from the combustion chamber.

21. The method of claim 20 wherein the collecting step includes gravitationally feeding the aluminum oxide particles from the combustion chamber directly to a receptacle.

* * * * *